US011372305B2

(12) United States Patent
Lin et al.

(10) Patent No.: US 11,372,305 B2
(45) Date of Patent: Jun. 28, 2022

(54) ANISOTROPIC CONDUCTIVE DIELECTRIC LAYER FOR ELECTROPHORETIC DISPLAY

(71) Applicant: E Ink California, LLC, Fremont, CA (US)

(72) Inventors: Craig Lin, Fremont, CA (US); Yu Li, Fremont, CA (US); Peter B. Laxton, Marshfield, MA (US); Lei Liu, Fremont, CA (US); Hui Du, Milpitas, CA (US); HongMei Zang, Fremont, CA (US)

(73) Assignee: E INK CALIFORNIA, LLC, Fremont, CA (US)

( * ) Notice: Subject to any disclaimer, the term of this patent is extended or adjusted under 35 U.S.C. 154(b) by 352 days.

(21) Appl. No.: 16/804,336

(22) Filed: Feb. 28, 2020

(65) Prior Publication Data
US 2020/0201133 A1 Jun. 25, 2020

Related U.S. Application Data

(63) Continuation of application No. 14/749,327, filed on Jun. 24, 2015, now Pat. No. 10,613,407.
(Continued)

(51) Int. Cl.
*G02F 1/167* (2019.01)
*G02F 1/1675* (2019.01)

(52) U.S. Cl.
CPC ...... *G02F 1/167* (2013.01); *G02F 2001/1678* (2013.01)

(58) Field of Classification Search
CPC ............ G02F 1/167; G02F 2001/1678; G02F 1/13458; G02F 1/13392; G02F 1/13398;
(Continued)

(56) References Cited

U.S. PATENT DOCUMENTS 6,376,393 B1   4/2002  Newton
6,411,316 B1   6/2002  Shigehiro et al.
(Continued)

FOREIGN PATENT DOCUMENTS

CN   203149253 U   8/2013
JP   2009132798 A  6/2009

OTHER PUBLICATIONS

Lee, H. et al., "SiPix Microcup Electronic Paper—An Introduction" Advanced Display, Issue 37, pp. 4-9, (Jun. 2003). (in Chinese, English abstract attached) Jun. 1, 2003.
(Continued)

*Primary Examiner* — Brandi N Thomas
(74) *Attorney, Agent, or Firm* — Ioannis Constantinides

(57) ABSTRACT

The present invention is directed to an electrophoretic display device comprising microcells filled with an electrophoretic fluid and a dielectric layer, which comprises a first type of magnetic filler material, a second type of nonmagnetic filler material, and a polymeric material. The first and second types of filler material physically interact with each other and they are fixed and aligned in the dielectric adhesive layer in a direction perpendicular to a plane of the dielectric layer. The dielectric layer exhibits anisotropic conductivity having higher conductivity in the z direction compared to the other two orthogonal directions.

17 Claims, 7 Drawing Sheets

Related U.S. Application Data

(60) Provisional application No. 62/018,331, filed on Jun. 27, 2014.

(58) Field of Classification Search
CPC .............. G02F 1/13439; G02F 1/1368; G02F 1/16757; G02F 1/1677; G02F 1/1679; G02F 1/1681; G02F 2202/022; G02F 2202/16; H01L 27/3276; H01L 2227/323; H01L 2227/326; H01L 2251/105; H01L 2251/5338; H01L 2251/558; H01L 27/1225; H01L 27/124; H01L 27/3272; H01L 29/78606; H01L 51/003; H01L 51/0097; H01L 51/5221; H01L 51/5246; H01L 51/56; H01L 21/02554; H01L 21/02565; H01L 27/1214; H01L 27/1244; H01L 27/1248; H01L 27/1251; H01L 27/1255; H01L 27/3262; H01L 29/04; H01L 29/24; H01L 29/41733; H01L 29/45; H01L 29/66742; H01L 29/66969; H01L 29/78645; H01L 29/78648; H01L 29/7869; H01L 51/0021; H01L 51/0025; H01L 51/5206
See application file for complete search history.

(56) References Cited

U.S. PATENT DOCUMENTS

| | | | |
|---|---|---|---|
| 6,751,008 | B2 | 6/2004 | Liang et al. |
| 6,788,449 | B2 | 9/2004 | Liang et al. |
| 6,849,335 | B2 | 2/2005 | Igarashi |
| 6,859,302 | B2 | 2/2005 | Liang et al. |
| 6,930,818 | B1 | 8/2005 | Liang et al. |
| 6,933,098 | B2 | 8/2005 | Chan-Park et al. |
| 7,005,468 | B2 | 2/2006 | Zang et al. |
| 7,012,735 | B2 | 3/2006 | Honeyman |
| 7,110,163 | B2 | 9/2006 | Webber et al. |
| 7,166,182 | B2 | 1/2007 | Pereira et al. |
| 7,312,916 | B2 | 12/2007 | Pullen et al. |
| 7,347,957 | B2 | 3/2008 | Wu et al. |
| 7,535,624 | B2 | 5/2009 | Amundson et al. |
| 7,560,004 | B2 | 7/2009 | Pereira et al. |
| 7,572,491 | B2 | 8/2009 | Wang et al. |
| 7,616,374 | B2 | 11/2009 | Chen et al. |
| 7,843,626 | B2 | 11/2010 | Amundson et al. |
| 7,880,958 | B2 | 2/2011 | Zang et al. |
| 8,018,430 | B2 | 9/2011 | Choi |
| 8,441,432 | B2 | 5/2013 | Zang et al. |
| 8,519,944 | B2 | 8/2013 | Campisi |
| 8,547,628 | B2 | 10/2013 | Wu et al. |
| 8,609,532 | B2 * | 12/2013 | Swaminathan ... H01L 21/76877 438/622 |
| 8,830,561 | B2 | 9/2014 | Zang et al. |
| 8,964,282 | B2 | 2/2015 | Wang et al. |
| 9,388,307 | B2 | 7/2016 | Li et al. |
| 9,594,260 | B2 | 3/2017 | Farrand et al. |
| 9,759,976 | B2 | 9/2017 | Chen |
| 2004/0085619 | A1 | 5/2004 | Wu et al. |
| 2010/0261012 | A1 | 10/2010 | Huang et al. |
| 2011/0298786 | A1 | 12/2011 | Cho |
| 2012/0269728 | A1 | 10/2012 | Jen |
| 2013/0092426 | A1 | 4/2013 | Wu et al. |
| 2015/0378235 | A1 | 12/2015 | Lin et al. |

OTHER PUBLICATIONS

Chen, S.M., "The Applications for the Revolutionary Electronic Paper Technology", OPTO News & Letters, Issue 102, pp. 37-41 (Jul. 2003). (in Chinese, English abstract attached) Jul. 1, 2003.
Zang, H.M. et al., "Microcup Electronic Paper by Roll-to-Roll Manufacturing Processes", The Spectrum, 16(2), pp. 16-21 (2003). Jul. 1, 2003.
Allen, Kimberly, Ph.D., "Electrophoretics Fulfilled. Emerging Displays Review: Emerging Display Technologies, Monthly Report", Stanford Resources Display Insight, pp. 9-14, (Oct. 2003). Oct. 1, 2003.
Kleper, M. et al., "An Investigation of the Emerging and Developing Technologies Related to the Generation Beyond Print-on-Paper", Advanced Display Technologies, Rochester Institute of Technology, pp. 13-15, (Oct. 2003). Oct. 1, 2003.
Zang, H.M., "Microcup Electronic Paper by Roll-to-Roll Manufacturing Processes", Presentation at the Advisory Board Meeting, Bowling Green State Univ., Ohio, USA (Oct. 2003). Oct. 23, 2003.
Chung, J. et al., "Microcup Electrophoretic Displays, Grayscale and Color Rendition", IDW, AMD2 & EP1-2, pp. 243-246 (Dec. 2003). Dec. 1, 2003.
Ho, C. et al., "Microcup Electronic Paper by Roll-to-Roll Manufacturing Processes", Presentation conducted at FEG, Nei-Li, Taiwan, (Dec. 2003). Dec. 23, 2003.
Zang, H.M. et al., "Threshold and Grayscale Stability of Microcup Electronic Paper", SPIE vol. 5289, pp. 102-108, (Jan. 2004). Jan. 19, 2004.
Zang, H.M., "Microcup Electronic Paper", Presentation at the Displays & Microelectronics Conference of U.S. Display Consortium, Phoenix, Arizona, USA (Feb. 2004). Feb. 10, 2004.
Wang, X. et al., "Microcup Electronic Paper and the Converting Processes", ASID, 10.1.2-26, pp. 396-399, Nanjing, China, (Feb. 2004). Feb. 15, 2004.
Chaug, Y.S. et al., "Roll-to-Roll Processes for the Manufacturing of Patterned Conductive Electrodes on Flexible Substrates", Mat. Res. Soc. Symp. Proc., vol. 814, 19.6.1., (Apr. 2004). Apr. 12, 2004.
Liang, R.C., "Microcup Electronic Paper by Roll-to-Roll Manufacturing Process", Presented at the Flexible Displays & Electronics 2004 of Intertech, San Fransisco, California, USA, (Apr. 2004). Apr. 28, 2004.
Hou, J. et al., "Reliability and Performance of Flexible Electrophoretic Displays by Roll-to-Roll Manufacturing Processes", SID Digest, 32.3, pp. 1066-1069 (May 2004). May 27, 2004.
Wang, X. et al., "Microcup Electronic Paper and the Converting Processes", Advanced Display, Issue 43, pp. 48-51 (Jun. 2004). (in Chinese, with English abstract) Jun. 1, 2004.
Liang, R.C. et al., "Format Flexible Microcup Electronic Paper by Roll-to-Roll Manufacturing Process", Presented at 14th FPD Manufacturing Technology EXPO & Conference, Tokyo, Japan, (Jun. 30, 2004-Jul. 2, 2004). Jul. 2, 2004.
Liang, R.C., "Flexible and Rollable Displays/Electronic Paper—A Technology Overview", Presented at the METS Conference, Taipei, Taiwan, (Oct. 2004). Oct. 22, 2004.
Bardsley, J.N. et al., "Microcup Electrophoretic Displays", USDC Flexible Display Report, 3.1.2., pp. 3-12 to 3-16, (Nov. 2004). Nov. 1, 2004.
Ho, Candice, "Microcup Electronic Paper Device and Application", Presentation conducted at USDC 4th Annual Flexible Display and Microelectronics Conference, Phoenix, Arizona, USA, (Feb. 1, 2005). Feb. 1, 2005.
Zang, H.M. et al., "Flexible Microcup EPD by RTR Process", Presentation conducted at 2nd Annual Paper-Like Displays Conference, St. Pete Beach, Florida, USA, (Feb. 9-11, 2005). Feb. 10, 2005.
Liang, R.C., "Flexible and Roll-able Displays/Electronic Paper—A Brief Technology Overview", Presentation at Flexible Display Forum, Taiwan (Feb. 2005). Feb. 17, 2005.
Wang, X. et al., "Inkjet Fabrication of Multi-Color Microcup Electrophorectic Display", 5th Flexible Microelectronics & Displays Conference of U.S. Display Consortium, Phoenix, AZ, USA, (Feb. 2006). Feb. 9, 2006.
Zang, H.M., et al., "Monochrome and Area Color Microcup EPDs by Roll-to-Roll Manufacturing Processes", ICIS 06 International Congress of Imaging Science Final Program and Proceedings, pp. 362-365, Rochester, New York, USA (May 2006). May 9, 2006.
Wang, X. et al., "Roll-to-Roll Manufacturing Process for Full Color Electrophoretic Film", SID 06 Digest, vol. 37, Issue 1, pp. 1587-1589, (Jun. 2006) Jun. 8, 2006.
Zang, H.M., "Monochrome and Area Color Microcup EPDs by Roll-to-Roll Manufacturing Process", Presentation conducted at the

(56) References Cited

OTHER PUBLICATIONS

Fourth Organic Electronics Conference and Exhibition (OEC-06), Frankfurt, Germany, (Sep. 25-27, 2006). Sep. 26, 2006.
Ho, Andrew, "Embedding e-Paper in Smart Cards, Pricing Labels & Indicators", Presentation conducted at Smart Paper Conference, Atlanta, GA, USA (Nov. 15-16, 2006). Nov. 15, 2006.
Zang, H.M., "Developments in Microcup Flexible Displays", Presentation conducted at the 6th Annual Flexible Display and Microelectronics Conference, Phoenix, AZ, Feb. 6-8, 2007. Feb. 7, 2007.
Zang, H.M. et al., "Microcup e-Paper for Embedded and Flexible Designs", IDMC'07, Taipei International Convention Center, Taiwan, (Jul. 2007). Jul. 6, 2007.
Sprague, R.A., "SiPix Microcup Electrophoretic Epaper for Ebooks", NIP 25, 2009, pp. 460-462; (Sep. 23, 2009). (Presentation conducted on Sep. 23, 2009 at the 25th Int'l Conference on Digital Printing Technologies,Louisville, Kentucky, USA.) Sep. 23, 2009.
Korean Intellectual Property Office; PCT/US2015/037486; International Search Report and Written Opinion; Oct. 14, 2015. Oct. 14, 2015.
Liang, R.C., "BreakThrough-Newly-Developed Color Electronic Paper Promises—Unbeatable Production Efficiency", Nikkei Microdevices, p. 3 (Dec. 2002). (in Japanese, with English translation). Dec. 1, 2002.
Liang, R.C. et al., "Microcup Electrophoretic Displays by Roll-to-Roll Manufacturing Processes", IDW '02, Paper EP2-2, pp. 1337-1340, (Dec. 2002) Dec. 4, 2002.
Liang, R.C., "Microcup Electrophoretic and Liquid Crystal Displays by Roll-to-Roll Manufacturing Processes", Presented at Flexible Microelectronics & Displays Conference of U.S. Display Consortium, Phoenix, Arizona, USA (Feb. 2003). Feb. 3, 2003.
Liang, R.C. et al., "Microcup LCD, A New Type of Dispersed LCD by a Roll-to-Roll Manufacturing Process", Presented at IDMC , Paper We-02-04, pp. 1-4, Taipei, Taiwan, (Feb. 2003). Feb. 18, 2003.
Liang, R.C. et al., "Passive Matrix Microcup Electrophoretic Displays", IDMC'03, Paper FR-17-5, p. 1-4, Taipei, Taiwan, (Feb. 2003). Feb. 18, 2003.
Liang, R.C.et al., "Microcup Displays: Electronic Paper by Roll-to-Roll Manufacturing Processes" Journal of the SID, 11 (4), pp. 621-628, (Feb. 2003). Feb. 18, 2003.
Chen, S.M., "Revolution electronic paper: The New Application and the Dynamics of Companies", Topology Research Institute, pp. 1-10, (May 2003). (In Chinese, English abstract attached) May 1, 2003.
Liang, R.C. et al., "Microcup Active and Passive Matrix Electrophoretic Displays by a Roll-to-Roll Manufacturing Processes", SID 03 Digest, Paper 20.1, pp. 838-841 (May 2003). May 21, 2003.

\* cited by examiner

ANISOTROPIC CONDUCTIVE DIELECTRIC LAYER FOR ELECTROPHORETIC DISPLAY

RELATED APPLICATIONS

This application is a continuation of U.S. application with Ser. No. 14/749,327 filed on Jun. 24, 2015, which claims priority to and the benefit of U.S. Provisional application with Ser. No. 62/018,331, filed Jun. 27, 2014, the contents of which are incorporated by reference herein in their entireties.

TECHNICAL FIELD

The present invention relates to an anisotropic conductive dielectric layer for an electrophoretic display device.

BACKGROUND OF INVENTION

An electrophoretic display (EPD) is a non-emissive device based on the electrophoresis phenomenon influencing charged pigment particles dispersed in a dielectric solvent. An EPD typically comprises a pair of spaced-apart plate-like electrodes. At least one of the electrode plates, typically on the viewing side, is transparent. An electrophoretic fluid composed of a dielectric solvent with charged pigment particles dispersed therein is enclosed between the two electrode plates.

An electrophoretic fluid may have one type of charged pigment particles dispersed in a solvent or solvent mixture of a contrasting color. In this case, when a voltage difference is imposed between the two electrode plates, the pigment particles migrate by attraction to the plate of polarity opposite that of the pigment particles. Thus, the color showing at the transparent plate may be either the color of the solvent or the color of the pigment particles. Reversal of plate polarity will cause the particles to migrate to the opposite plate, thereby reversing the color.

Alternatively, an electrophoretic fluid may have two types of pigment particles of contrasting colors and carrying opposite charge polarities, and the two types of pigment particles are dispersed in a clear solvent or solvent mixture. In this case, when a voltage difference is imposed between the two electrode plates, the two types of pigment particles would move to the opposite ends. Thus one of the colors of the two types of the pigment particles would be seen at the viewing side.

In another alternative, pigment particles of additional visually distinguishable colors are added to an electrophoretic fluid for forming a highlight or multicolor display device.

DETAILED DESCRIPTION

The present invention is particularly suitable for a microcell-based electrophoretic display.

Figure 1:
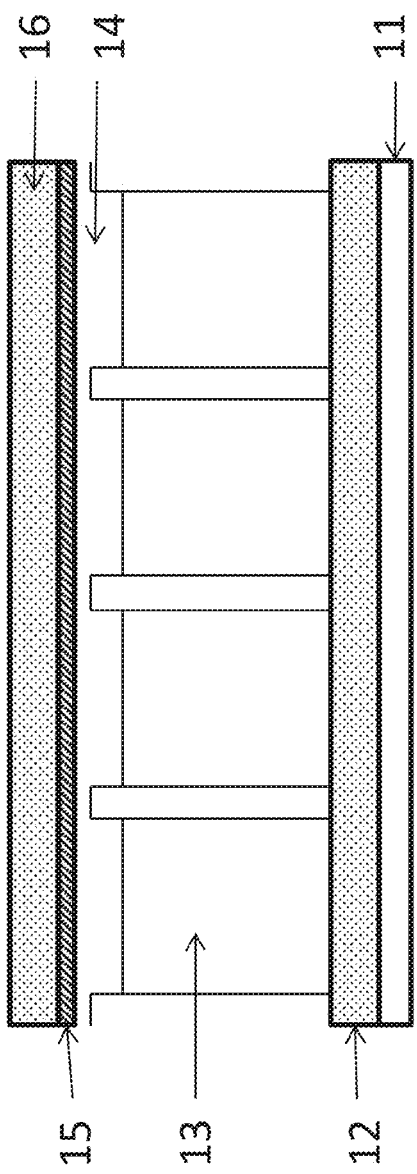
FIGS. 1 and 2 depict cross-sectional views of a microcell-based electrophoretic display film structure.

U.S. Pat. Nos. 6,930,818 and 6,933,098 describe the microcell technology for the preparation of an electrophoretic display. As shown in FIG. 1, microcells (13) may be formed on a transparent electrode layer (12) which is laminated to a transparent substrate (11). The microcells formed are filled with an electrophoretic fluid (not shown) and the filled microcells are then sealed with a sealing layer (14). A backplane (16) is laminated over the sealing layer (14), with an adhesive layer (15).

It is also possible to have a primer layer (not shown) between the microcells (13) and the transparent electrode layer (12).

Figure 2:
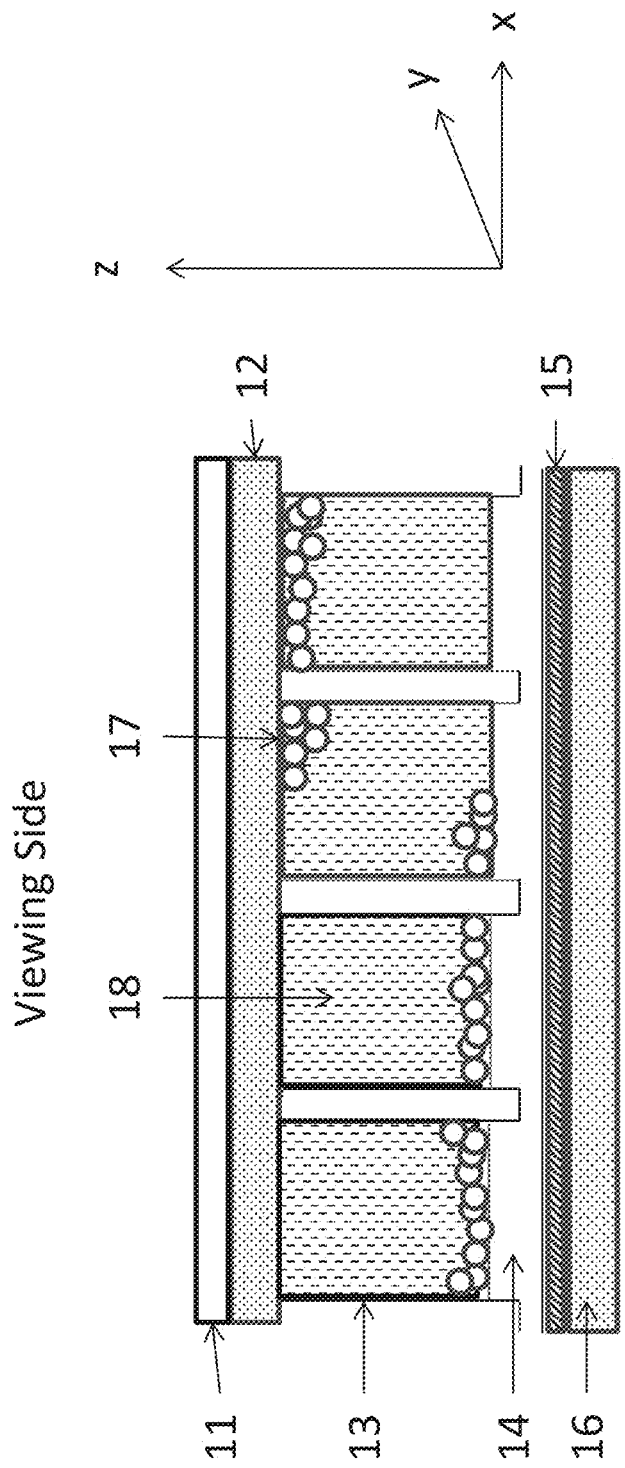

FIG. 2 is a cross-section view of a film structure of a microcell-based electrophoretic display, with the transparent electrode layer (12) on the viewing side, and the sealing layer (14), the adhesive layer (15) and the backplane (16) on the non-viewing side.

The electrophoretic fluid filled in the microcells (13) comprises charged pigment particles (17) dispersed in a solvent or solvent mixture (18).

In the context of the present invention, the microcell forming material, the sealing layer, the adhesive layer and the primer layer (if present) are collectively referred to as "dielectric layer".

A certain range of resistivity or conductivity is required for the dielectric layer, in order to have sufficient driving voltage for the display fluid. However, conductivity in the x-y direction often causes cross talk, which results in text blurring and/or color mixing between adjacent pixels. Anisotropic conductivity is, therefore, preferred for the dielectric layer, especially for the sealing and adhesive layers. In other words, the z-direction is preferably more conductive than the x-y plane.

Suitable materials for the dielectric layers are described in patent applications previously filed by SiPix Imaging, Inc. and patents granted therefrom (e.g., U.S. Pat. Nos. 6,930, 818, 6,859,302, 6,751,008, 7,005,468, 7, 166,182, 7,347, 957, 7,560,004, 7,572,491, 7,616,374, 7,880,958, 8,547,628, 8,830,561 and U.S. patent application Ser. No. 13/686,778), the contents of all of which are incorporated herein by reference in their entirety.

Examples of components in a composition for forming microcells, may include, but are not limited to, thermoplastic or thermoset materials or a precursor thereof, such as multifunctional vinyls including, but not limited to, acrylates, methacrylates, allyls, vinylbenzenes, vinylethers, multifunctional epoxides and oligomers or polymers thereof, and the like. Multifunctional acrylate and oligomers thereof are often used. A combination of a multifunctional epoxide and a multifunctional acrylate is also useful to achieve desirable physico-mechanical properties of the microcells. A low Tg (glass transition temperature) binder or crosslinkable oligomer imparting flexibility, such as urethane acrylate or polyester acrylate, may also be added to improve the flexure resistance of the embossed microcells.

Further examples of composition for microcells may comprise a polar oligomeric or polymeric material. Such a polar oligomeric or polymeric material may be selected from the group consisting of oligomers or polymers having at least one of the groups such as nitro ($-NO_2$), hydroxyl ($-OH$), carboxyl ($-COO$), alkoxy ($-OR$ wherein R is an alkyl group), halo (e.g., fluoro, chloro, bromo or iodo), cyano ($-CN$), sulfonate ($-SO_3$) and the like. The glass transition temperature of the polar polymer material is preferably below about 100° C. and more preferably below about 60° C. Specific examples of suitable polar oligomeric or polymeric materials may include, but are not limited to, polyhydroxy functionalized polyester acrylates (such as BDE 1025, Bomar Specialties Co, Winsted, Conn.) or alkoxylated acrylates, such as ethoxylated nonyl phenol acrylate (e.g., SR504, Sartomer Company), ethoxylated trimethylolpropane triacrylate (e.g., SR9035, Sartomer Company) or ethoxylated pentaerythritol tetraacrylate (e.g., SR494, from Sartomer Company).

Alternatively, the microcell composition may comprise (a) at least one difunctional UV curable component, (b) at least one photoinitiator, and (c) at least one mold release agent. Suitable difunctional components may have a molecular weight higher than about 200. Difunctional acrylates are preferred and difunctional acrylates having an urethane or ethoxylated backbone are particularly preferred. More specifically, suitable difunctional components may include, but are not limited to, diethylene glycol diacrylate (e.g., SR230 from Sartomer), triethylene glycol diacrylate (e.g., SR272 from Sartomer), tetraethylene glycol diacrylate (e.g., SR268 from Sartomer), polyethylene glycol diacrylate (e.g., SR295, SR344 or SR610 from Sartomer), polyethylene glycol dimethacrylate (e.g., SR603, SR644, SR252 or SR740 from Sartomer), ethoxylated bisphenol A diacrylate (e.g., CD9038, SR349, SR601 or SR602 from Sartomer), ethoxylated bisphenol A dimethacrylate (e.g., CD540, CD542, SR101, SR150, SR348, SR480 or SR541 from Sartomer), and urethane diacrylate (e.g., CN959, CN961, CN964, CN965, CN980 or CN981 from Sartomer; Ebecryl 230, Ebecryl 270, Ebecryl 8402, Ebecryl 8804, Ebecryl 8807 or Ebecryl 8808 from Cytec). Suitable photoinitiators may include, but are not limited to, bis-acyl-phosphine oxide, 2-benzyl-2-(dimethylamino)-1-[4-(4-morpholinyl)phenyl]-1-butanone, 2,4,6-trimethylbenzoyl diphenyl phosphine oxide, 2-isopropyl-9H-thioxanthen-9-one, 4-benzoyl-4'-methyldiphenylsulphide and 1-hydroxy-cyclohexyl-phenyl-ketone, 2-hydroxy-2-methyl-1-phenyl-propan-1-one, 1-[4-(2-hydroxyethoxy)-phenyl]-2-hydroxy-2-methyl-1-propane-1-one, 2,2-dimethoxy-1,2-diphenylethan-1-one or 2-methyl-1[4-(methylthio)phenyl]-2-morpholinopropan-1-one. Suitable mold release agents may include, but are not limited to, organomodified silicone copolymers such as silicone acrylates (e.g., Ebercryl 1360 or Ebercyl 350 from Cytec), silicone polyethers (e.g., Silwet 7200, Silwet 7210, Silwet 7220, Silwet 7230, Silwet 7500, Silwet 7600 or Silwet 7607 from Momentive). The composition may further optionally comprise one or more of the following components, a co-initiator, monofunctional UV curable component, multifunctional UV curable component or stabilizer.

Examples of essential components in a sealing composition may include, but are not limited to, thermoplastic or thermoset and their precursor thereof. Specific examples may include materials such as monofunctional acrylates, monofunctional methacrylates, multifunctional acrylates, multifunctional methacrylates, polyvinyl alcohol, polyacrylic acid, cellulose, gelatin or the like Additives such as a polymeric binder or thickener, photoinitiator, catalyst, vulcanizer, filler, colorant or surfactant may be added to the sealing composition to improve the physico-mechanical properties and the optical properties of the display.

For an organic-based display fluid, the sealing material may be a water soluble polymer with water as the sealing solvent. Examples of suitable water soluble polymers or water soluble polymer precursors may include, but are not limited to, polyvinyl alcohol; polyethylene glycol, its copolymers with polypropylene glycol, and its derivatives, such as PEG-PPG-PEG, PPG-PEG, PPG-PEG-PPG; poly(vinylpyrrolidone) and its copolymers such as poly(vinylpyrrolidone)/vinyl acetate (PVP/VA); polysaccharides such as cellulose and its derivatives, poly(glucosamine), dextran, guar gum, and starch; gelatin; melamine-formaldehyde; poly(acrylic acid), its salt forms, and its copolymers; poly (methacrylic acid), its salt forms, and its copolymers; poly (maleic acid), its salt forms, and its copolymers; poly(2-dimethylaminoethyl methacrylate); poly(2-ethyl-2-oxazoline); poly(2-vinylpyridine); poly(allylamine); polyacrylamide; polyethylenimine; polymethacrylamide; poly(sodium styrene sulfonate); cationic polymer functionalized with quaternary ammonium groups, such as poly(2-methacryloxyethyltrimethylammonium bromide), poly(allylamine hydrochloride). The sealing material may also include a water dispersible polymer with water as a formulating solvent. Examples of suitable polymer water dispersions may include polyurethane water dispersion and latex water dispersion. Suitable latexes in the water dispersion include polyacrylate, polyvinyl acetate and its copolymers such as ethylene vinyl acetate, and polystyrene copolymers such as polystyrene butadiene and polystyrene/acrylate.

Examples of essential components in an adhesive composition may include, but are not limited to, acrylics, styrene-butadiene copolymers, styrene-butadiene-styrene block copolymers, styrene-isoprene-styrene block copolymers, polyvinylbutyral, cellulose acetate butyrate, polyvinylpyrrolidone, polyurethanes, polyamides, ethylene-vinylacetate copolymers, epoxides, multifunctional acrylates, vinyls, vinylethers, and their oligomers, polymers and copolymers. The adhesive may also contain polyurethane dispersions and water soluble polymer selected from the group consisting of polyvinyl alcohol; polyethylene glycol and its copolymers with polypropylene glycol; poly(vinylpyrrolidone) and its copolymers; polysaccharides; gelatin; poly (acrylic acid), its salt forms, and its copolymers; poly (methacrylic acid), its salt forms, and its copolymers; poly (2-dimethylaminoethyl methacrylate); poly(2-ethyl-2-oxazoline); poly(2-vinylpyridine); poly(allylamine); polyacrylamide; polymethacrylamide; and a cationic polymer functionalized with quaternary ammonium groups. The adhesive layer may be post cured by, for example, heat or radiation such as UV after lamination.

Examples of essential components in a primer layer composition may include, but are not limited to, a thermoplastic or thermoset material or a precursor thereof, such as polyurethane, a multifunctional acrylate or methacrylate, a vinylbenzene, a vinylether, an epoxide or an oligomers or polymer thereof.

Figure 3:
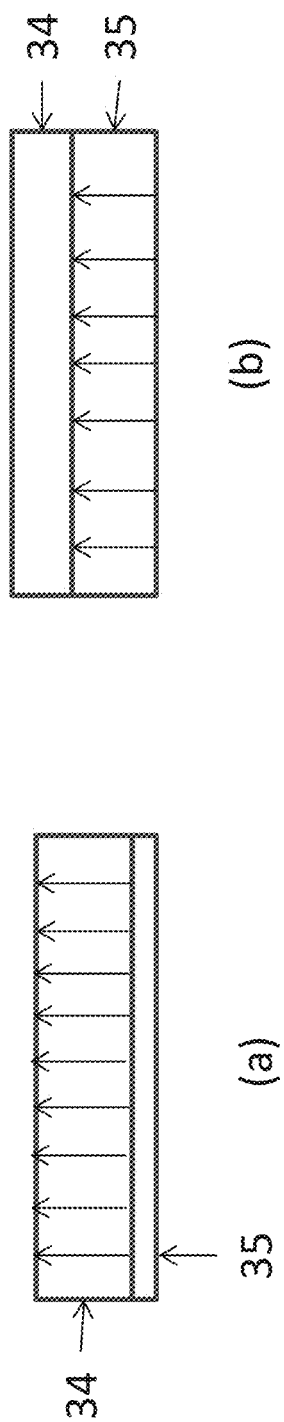
FIG. 3 illustrates anisotropic conductivity of a microcell-based electrophoretic display.

For the sealing and adhesive layers, there are two options to achieve anisotropic conductivity. As shown in FIG. 3(a), a sealing layer (34) which is thicker has anisotropic conductivity while an adhesive layer (35) is isotropic. In FIG. 3(a), the sealing layer may have a thickness of 8-20 µm and the adhesive layer may have a thickness of 2-6 µm. In FIG. 3(b), an adhesive layer (35) with a thickness of 2-10 µm, has anisotropic conductivity and a sealing layer (34), with a thickness of 5-10 µm, is isotropic. The total thickness of sealing and adhesive layer in FIGS. 3(a) and 3(b) is preferred to be less than 25 µm.

In order to generate anisotropic conductivity, a filler material is often added into a dielectric layer composition, such as a sealing or adhesive layer forming composition. The filler material may have both magnetic property and a certain level of conductivity. Examples of such filler material may include, but are not limited to, nickel particles or nanowires, cobalt particles or nanowires, iron particles or nanowires, silver or gold coated nickel particles, nickel coated carbon nanotubes and gold/nickel/graphite core-shell structure particles. The filler material is in a dielectric layer which may be in a sealing layer, in an adhesive layer or in both layers. If it is in one of the layers, it is preferably in the layer which is thicker.

While the term "filler" or "filler material" is referred to in the present application, it is understood that the "filler" or "filler" material may be in any type of physical form, e.g., tubes, rods, wires, flakes, platelets, fibers, spherical particles or irregular particles.

The filler material is usually in the form of nanoparticles. The term "nanoparticles", in the context of the present invention, refers to particles having an average primary particle size which is smaller than the range of UV-visible scattering light (about 0.15 to about 0.3 um) or a typical short range surface roughness (about 0.05 to about 0.1 um) of a plastic film. More specifically, the average primary size of the filler particles suitable for the present invention is in the range of about 5 to about 300 nanometers, preferably about 10 to about 150 nanometers, and more preferably about 15 to about 100 nanometers. The filler may also be in the form of other nanostructures as mentioned above. It is noted that if the filler material is in a "long" form, such as rods, tubes or wires, the length could be in the ranges of 0.1 to 10 microns or even higher.

The filler material may be directly added to a composition for a dielectric layer. Alternatively, a filler material may be first dispersed in a solvent and the dispersion is added to a dielectric layer composition.

Figure 4:
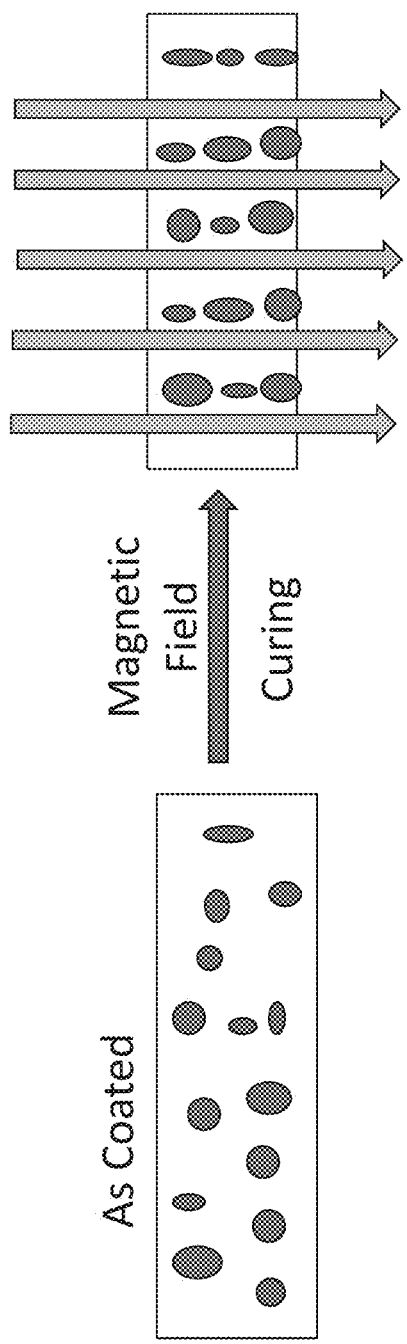
FIG. 4 illustrates orientation of filler particles for maintenance of anisotropic conductivity.

After the sealing and adhesive layers are applied in a film structure and during the drying and curing process, a magnetic field is applied on top of, or below, the film structure to align all of the filler particles in the z-direction, or toward the z-direction, which is perpendicular to the film plane. The drying and curing process fixes the orientation of the filler particles in the dielectric layer(s) to maintain the anisotropic feature (see FIG. 4).

Figure 5:
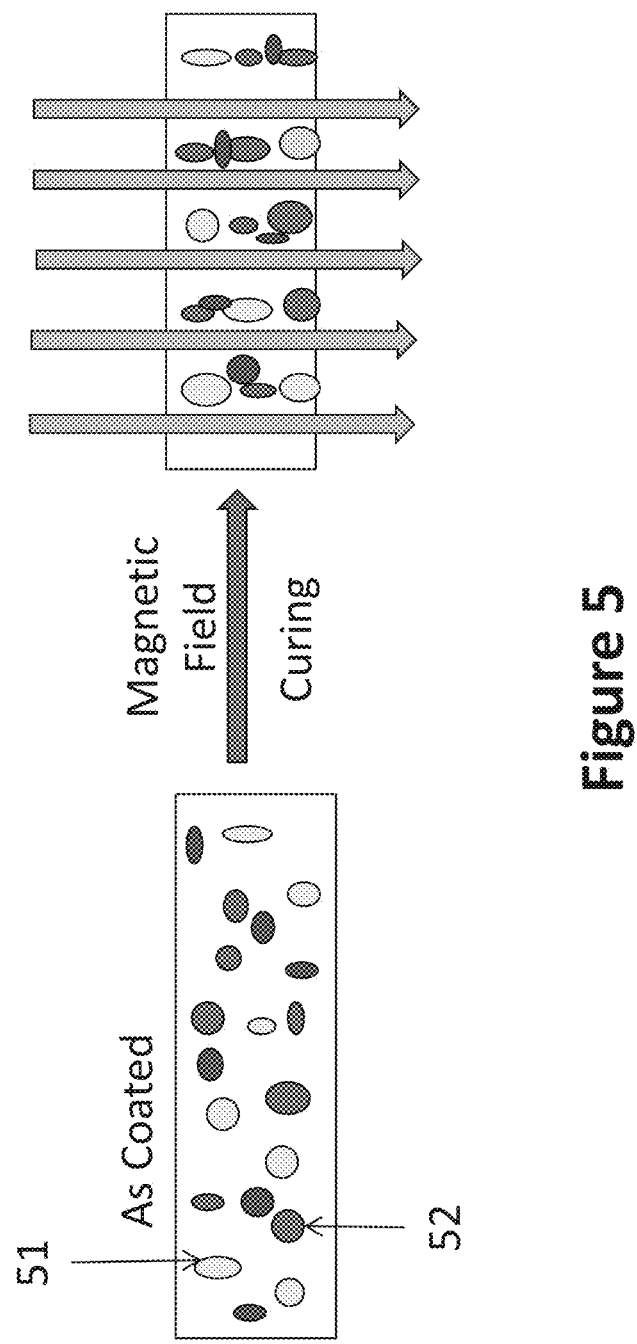
FIGS. 5-7 illustrate mixtures of two types of fillers in a dielectric layer.

A mixture of two or more types of filler material may be in a dielectric layer. An embodiment for a two-filler option where only one type of the filler material is sensitive to the magnetic field is shown in FIG. 5. A filler material is "sensitive to a magnetic field" if it can be aligned with the magnetic field.

Due to the interaction between the two types of filler material, one (51) is sensitive to a magnetic field (i.e., sensitive filler particles) and the other (52) is insensitive to a magnetic field (i.e., inert filler particles), the inert particles will also be aligned when a magnetic field is applied. In other words, the inert filler material can also be aligned when there is good affinity between the inert filler material and the sensitive filler material. In this case, the electrical conductivity may come from either the sensitive filler material or the inert filler material, or from both sensitive and inert materials.

Not shown, it is also possible to have both of the filler material sensitive to a magnetic field in a two-filler option. An alignment for both types of filler can be achieved, and electrical conductivity may come from one type of the filler or from both types of the filler.

When using a mixture of fillers that contains more than two types of filler materials, at least one type of filler material needs to be sensitive to a magnetic field in order to achieve alignment. Electrical conductivity may come from either magnetically sensitive material (one or more types), or from inert filler material (one or more types), or from both types.

Figure 6:
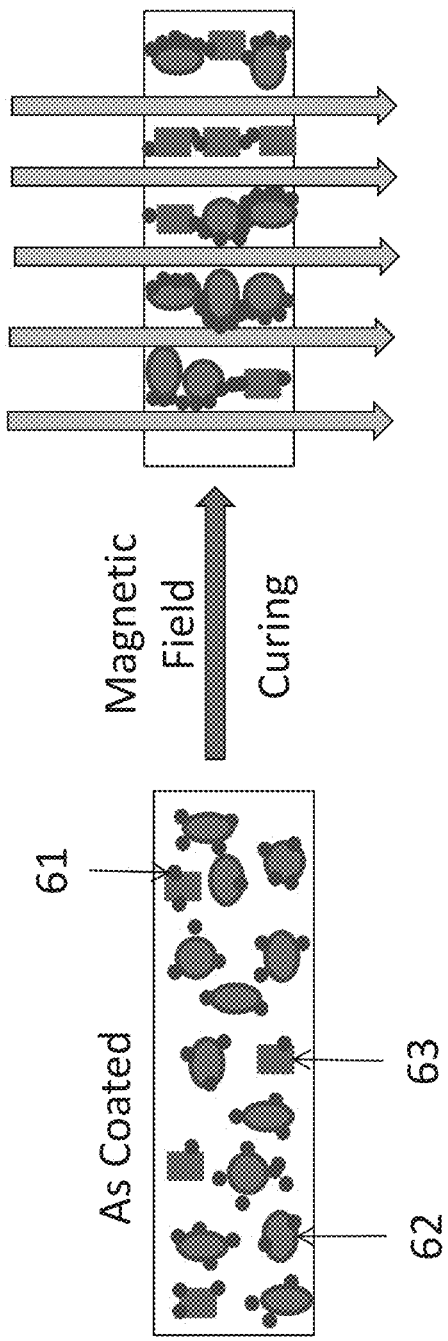

An embodiment is shown in FIG. 6 where filler particles (62) are sensitive to a magnetic field, while filler particles (61) are responsible for the electrical conductivity after alignment.

The affinity between different types of fillers could be physical or chemical interaction, or both.

Figure 7:
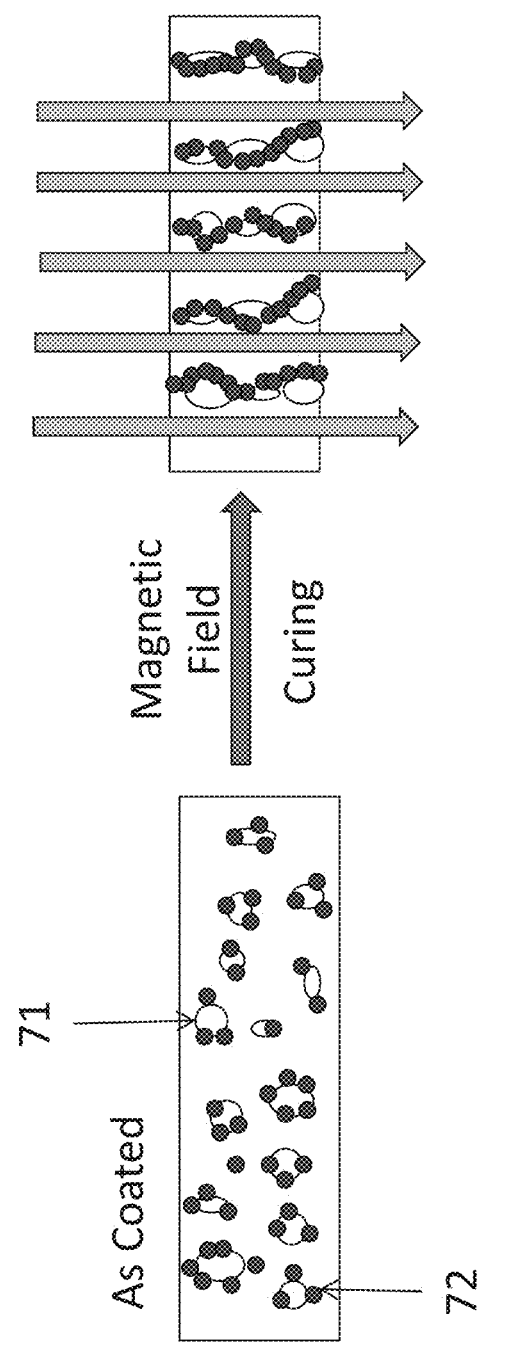

The embodiment in FIG. 7 shows another example of a two-filler mixture. The filler particles (71) are sensitive to a magnetic field and act as a template for the conductive filler particles (72) to form a conductive pathway. The conductive filler particles could be chemically attached to the surface of magnetic filler particles or adhere onto their surface through physical attraction. The affinity or interaction can exist between two or more than two types of fillers and it is also possible to have both physical and chemical interactions between different fillers in one mixture.

Examples of the sensitive filler may include, but are not limited to, nickel particles or nanowires, cobalt particles or nanowires, iron particles or nanowires, aluminum-nickel-cobalt alloy particles, silver or gold coated nickel particles, nickel coated carbon nanotubes and gold/nickel/graphite core-shell structure particles. The sensitive filler can be conductive (such as nickel particles or nanowires, cobalt particles or nanowires or iron particles or nanowires) or non-conductive (such as compound or alloy material based on nickel, cobalt or iron, which has low conductivity, but good magnetic property).

Examples of the inert filler may include, but are not limited to, silica, clay, silver, gold, carbon black, graphite, carbon nanotubes and PEDOT [poly(3,4-ethylenedioxythiophene)]. Among them, silica and clay are non-conductive inert fillers.

The concentration of the fillers and the ratio of different types of filler in a composition have to be optimized based on the desired magnetic and conductive properties. For example, in the case of nanotube, the concentration is controlled to be lower than 25% by weight of total filler loading.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective and scope of the present invention. All such modifications are intended to be within the scope of the claims appended hereto.

What is claimed is:

1. An electrophoretic display device comprising
   (a) microcells filled with an electrophoretic fluid,
   (b) a dielectric layer which comprises a first type of filler material, a second type of filler material, and a polymeric material,
   (c) first and second electrodes,
   wherein the microcells and the dielectric layer are disposed between the first and second electrodes,
   wherein at least one of the electrodes is transparent,
   wherein the first type of filler material is sensitive to a magnetic field and the second type of filler material is insensitive to a magnetic field, the second type of filler material having an affinity to the first type of filler material, the affinity between the second type of filler material and the first type of filler material is physical interaction,
   wherein the first type of filler material and the second types of filler material are fixed and aligned in the dielectric adhesive layer in a z direction perpendicular to a plane of the dielectric layer, and wherein the dielectric layer exhibits anisotropic conductivity having higher conductivity in the z direction compared to the other two directions x and y, which are orthogonal to the z direction.

2. The electrophoretic display device of claim 1, wherein the physical interaction between the second type filler material and the first type of filler material is comprises an attractive force selected from the group consisting of electrostatic, hydrogen bond, ion-dipole, ion-induced dipole, dipole-dipole, dipole-induced dipole, and van der Waal.

3. The electrophoretic display device of claim 1, wherein the dielectric layer is a layer of a material forming the microcells, a sealing layer, an adhesive layer or a primer layer.

4. The electrophoretic display device of claim 1, wherein the first type of filler material is selected from the group consisting of nickel particles, cobalt particles, iron particles, nickel nanowires, cobalt nanowires, iron nanowires, silver coated nickel particles, gold coated nickel particles, nickel coated carbon nanotubes, gold/nickel/graphite core-shell structure particles, and combinations thereof.

5. The electrophoretic display device of claim 3, wherein the dielectric layer is the sealing layer or the adhesive layer.

6. The electrophoretic display device of claim 1, further comprising a third type of filler material.

7. The electrophoretic display device of claim 6, wherein the third type of filler material is sensitive to a magnetic field.

8. The electrophoretic display device of claim 6, wherein the third type of filler material is insensitive to a magnetic field.

9. The electrophoretic display device of claim 7, wherein the third type of filler material is selected from the group consisting of nickel particles, cobalt particles, iron particles, nickel nanowires, cobalt nanowires, iron nanowires, silver coated nickel particles, gold coated nickel particles, nickel coated carbon nanotubes, gold/nickel/graphite core-shell structure particles, and combinations thereof.

10. The electrophoretic display device of claim 1, wherein the first type of filler material is conductive.

11. The electrophoretic display device of claim 10, wherein the first type of filler material is selected from the group consisting of nickel particles, nickel nanowires, cobalt particles, cobalt nanowires, iron particles, iron nanowires, and combinations thereof.

12. The electrophoretic display device of claim 1, wherein the first type of filler material is non-conductive.

13. The electrophoretic display device of claim 12, wherein the first type of filler material is a compound based on nickel, cobalt or iron.

14. The electrophoretic display device of claim 1, wherein the second type of filler material is conductive.

15. The electrophoretic display device of claim 14, wherein the second type of filler material is selected from the group consisting of silver, gold, carbon black, graphite, carbon nanotubes and poly(3,4-ethylenedioxythiophene).

16. The electrophoretic display device of claim 1, wherein the second type of filler material is non-conductive.

17. The electrophoretic display device of claim 16, wherein the second type of filler material is clay or silica.

* * * * *